United States Patent
Sorg

(10) Patent No.: US 11,817,682 B2
(45) Date of Patent: Nov. 14, 2023

(54) METHOD AND DEVICE FOR PRODUCING AN ELECTRICAL CABLE

(71) Applicant: Metzner Holding GmbH, Ulm (DE)

(72) Inventor: Manfred Sorg, Ulm (DE)

(73) Assignee: Metzner Holding GmbH, Ulm (DE)

( * ) Notice: Subject to any disclaimer, the term of this patent is extended or adjusted under 35 U.S.C. 154(b) by 18 days.

(21) Appl. No.: 17/430,291

(22) PCT Filed: Feb. 12, 2020

(86) PCT No.: PCT/EP2020/053537
§ 371 (c)(1),
(2) Date: Aug. 11, 2021

(87) PCT Pub. No.: WO2020/165209
PCT Pub. Date: Aug. 20, 2020

(65) Prior Publication Data
US 2022/0077666 A1     Mar. 10, 2022

(30) Foreign Application Priority Data

Feb. 12, 2019   (DE) .......................... 102019103487.6

(51) Int. Cl.
*H02G 1/12*     (2006.01)
*H01R 43/28*    (2006.01)

(52) U.S. Cl.
CPC .......... *H02G 1/1297* (2013.01); *H01R 43/28* (2013.01); *H02G 1/1256* (2013.01);
(Continued)

(58) Field of Classification Search
CPC .. H02G 1/1297; H02G 1/1273; H02G 1/1275; H02G 1/1285; H02G 1/128;
(Continued)

(56) References Cited

U.S. PATENT DOCUMENTS

| 1,477,678 A | | 12/1923 | Wetmore |
| 1,784,298 A | * | 12/1930 | Mahan ................. H02G 1/1265 29/DIG. 83 |

(Continued)

FOREIGN PATENT DOCUMENTS

| CH | 710236 A2 | 4/2016 |
| CN | 103887740 A | 6/2014 |

(Continued)

OTHER PUBLICATIONS

European Patent Office Communication pursuant to Article 94(3) EPC issued in App. No. EP20705052, dated May 4, 2023, 6 pages.
(Continued)

*Primary Examiner* — Thiem D Phan
(74) *Attorney, Agent, or Firm* — Koffsky Schwalb LLC

(57) ABSTRACT

The invention relates to a device (1) for producing an electrical cable (2) which has a cable film (20). The device has a film working module (9) for reducing the mechanical loadability of the cable film (20) at a crack position (PR) which is provided along a cable centre axis (M). The film working module (9) has a round blade (33) in order to cut into at least one outer layer, which is remote from the cable centre axis (M), of the cable film (20) at the crack position (PR).

30 Claims, 7 Drawing Sheets

(52) U.S. Cl.
CPC ......... *H02G 1/1273* (2013.01); *H02G 1/1275* (2013.01); *Y10T 29/53213* (2015.01)

(58) Field of Classification Search
CPC .... H02G 1/1282; H02G 1/1287; H02G 1/129; H02G 1/1265; H02G 15/184; Y10T 29/53213
USPC ......... 29/748, 747, 751, 753, 787, 857, 861, 29/863, 865, 867
See application file for complete search history.

(56) References Cited

U.S. PATENT DOCUMENTS

| | | | |
|---|---|---|---|
| 5,072,632 | A | 12/1991 | Sayyadi |
| 6,740,816 | B2 | 5/2004 | Treutlein |
| 9,520,700 | B2 | 12/2016 | Stepan |
| 9,906,005 | B2 | 2/2018 | Baldauf |
| 9,954,346 | B2 | 4/2018 | Meierhans |
| 10,056,743 | B2 | 8/2018 | Dober |
| 10,784,663 | B2 | 9/2020 | Messina |
| 2015/0128399 | A1 | 5/2015 | Meierhans |
| 2015/0357094 | A1 | 12/2015 | Ishigure |
| 2016/0180984 | A1 | 6/2016 | Cai |
| 2018/0175595 | A1 | 6/2018 | Ben-Ron |

FOREIGN PATENT DOCUMENTS

| | | | | |
|---|---|---|---|---|
| CN | 104769796 | A | | 7/2015 |
| CN | 106253027 | A | | 12/2016 |
| CN | 108155605 | A | | 6/2018 |
| DE | 3842754 | A1 | | 7/1989 |
| DE | 4327356 | A1 | | 2/1995 |
| DE | 10026714 | A1 | | 12/2001 |
| DE | 102004047384 | B3 | | 1/2006 |
| DE | 102015106129 | A1 | | 6/2016 |
| DE | 102017118445 | | * | 8/2017 ............. H02G 1/128 |
| DE | 102017118445 | | | 2/2019 |
| EP | 2117089 | A1 | | 11/2009 |
| EP | 2871736 | A1 | | 5/2015 |
| EP | 3089294 | A1 | | 11/2016 |
| EP | 3322054 | A1 | | 5/2018 |
| JP | 06022425 | | | 1/1994 |
| WO | 2007104402 | A1 | | 9/2007 |
| WO | 2015125129 | A1 | | 8/2015 |
| WO | 2018198877 | A1 | | 11/2018 |

OTHER PUBLICATIONS

European Patent Office Communication pursuant to Article 94(3) EPC issued in App. No. EP20705054, dated Apr. 28, 2023, 7 pages.
Chinese Office Action issued in App. No. CN202080024504.0, dated Feb. 27, 2023, 10 pages.
Non-Final Office Action dated Mar. 2, 2023 for U.S. Appl. No. 17/430,268 (pp. 1-5).

* cited by examiner

METHOD AND DEVICE FOR PRODUCING AN ELECTRICAL CABLE

The invention relates to a device for producing an electrical cable having a cable film.

The invention furthermore relates to a method for producing an electrical cable having a cable film.

In the context of producing an electrical cable, at least one cable end of the electrical cable is processed in order for the latter to be prepared for connecting to a plug connector, or in order for a plug connector to be partially or completely mounted on the cable end to be processed.

In electrical cables, cable films are at times used for electromagnetic shielding, for stabilizing and/or for protecting in relation to moisture or mechanical influences. For example, moisture in the form of vapor can damage the insulation of an electrical inner conductor of the cable—a cable film encasing the insulation here can be a remedy. Furthermore, a cable film can also be provided as a barrier layer between a braided cable shield and a cable sheath, whereby the cable sheath in a stripping process is more easily able to be stripped, or even stripped in the first place, because the cable sheath when stripping can otherwise be mechanically hooked or jammed, respectively, in the braided cable shield.

Depending on the use, a cable film can also be referred to as "shielding film", "insulation film", "protective film" or "film shield". The term "cable film" presently chosen is intended to cover all fields of application.

Cable films can be composed of a single base material, for example of a layer of an isolating material, for example a plastics material, or of a layer of an electrically conductive material, for example a metal. Often however, composite films which have at least two layers, in particular at least two layers of different materials, are also used.

When an electrical cable having a cable film is to be produced in an automated manner and in this process to be at least partially stripped, it is often necessary for an end piece of the cable film to be severed at a defined, provided position so as to expose the cable components lying therebelow. Because tear-resistant, or mechanically robust, respectively, films are preferably used, the severing of the cable film is complex and typically only possible manually in a manner providing sufficient accuracy and reliability in terms of the process. The procedure of the removal of the cable film thus significantly increases the process time and prevents a fully-automated cable production.

In order for the stripping, or the removal, respectively, of the cable film to be simplified, it is proposed in WO 2007/104402 A1 that the cable, or the cable film, respectively, is already produced such that the cable film can subsequently be more easily removed. The film here is produced with a number of mutually spaced-apart embossings which consequently cause weakening of the film material. Manual stripping can be facilitated as a result. However, it is disadvantageous that the cable film in this instance is mechanically weakened in the region of the entire cable, thus also in the region of the cable where the cable film is not to be removed. The intentional weakening of the film material can thus be counter-productive. Furthermore, the production process of the cable film is significantly more complex because the embossings also have to be incorporated in such a manner that said embossings ideally do not penetrate the film because the previously mentioned protection against moisture has to be guaranteed in most instances.

Moreover, one issue which arises in particular when removing the cable film in an automated manner is that the cable film is naturally very thin in comparison to the remaining components of the cable. When attempting to cut through the cable film, it can therefore be avoided only with difficulty in practice that components of the cable lying therebelow are also at least superficially scored or scratched, respectively, and thus damaged. The problem is even exacerbated in that many cables, according to the definition or at least for reasons of tolerances, do not have a uniformly circular cross section.

Damage to the insulation of an inner conductor by an unintentionally excessively deep cut can compromise the dielectric strength of the insulation, the mechanical robustness, or the resilience of the insulation and the electrical high-frequency characteristics of the cable.

When a braided cable shield running below the cable film, or any other conductor of the cable, is damaged by an excessively deep cut, the conductivity and the mechanical robustness, in particular the brittleness of the conductor, can deteriorate. A braided cable shield of tin-coated copper, which is often used, can be particularly susceptible. The damaged braided cable shield can consequently break at the damaged location when the cable is under stress, as a result of which the ground line and the electromagnetic tightness of the cable may be at risk.

In order to avoid the issue of damage to components of the cable below the cable film when cutting the cable film, a special cable is proposed in DE 10 2004 047 384 B3, in which cable a filler layer is provided below the cable film, wherein the blade of the knife when cutting through the film damages only the filler layer, the latter being a "sacrificial material", so to speak. A cable constructed in this manner can subsequently be prepared for assembly using simple stripping tools. A correspondingly equipped cable is however complex in terms of production and thus expensive, and has an increased weight and an enlarged circumference, as a result of which said cable appears to be overall impractical in practical use.

In view of the known prior art, the object of the present invention lies in providing an advantageous device for producing an electrical cable, by way of which device an end piece of a cable film can in particular be removed from the cable in a simple and reliable manner in terms of the process.

The present invention is also based on the object of providing a method for producing an electrical cable, by way of which method an end piece of a cable film can in particular be removed from the cable in a simple and reliable manner in terms of the process.

Provided is a device for producing an electrical cable having a cable film. The device has a film processing module for reducing the mechanical load-bearing capability of the cable film at a tearing position provided along a cable central axis.

The region of the electrical cable in which the processing predominantly takes place is hereunder at times also referred to as the "cable portion to be processed" or the "front cable end". To the extent that the relative indication "front" is used hereunder, this indication thus relates to the cable end being currently processed. To the extent that the relative indication "rear" is used hereunder, this indication thus relates to the rear cable end lying opposite the front cable end.

In the context of the production of the cable according to the invention, one of the two cable ends, or both cable ends, can be processed or produced, respectively. To the extent that both cable ends are processed or produced, respectively, this can take place successively or simultaneously.

In the context of the production of the cable according to the invention
   a) the cable, or the cable end to be processed, respectively, can be prepared for assembling a plug connector; and/or
   b) individual plug connector components of a plug connector can be partially assembled on the cable, or on the cable end to be processed, respectively; and/or
   c) a plug connector can be completely assembled on the cable, or on the corresponding cable end, respectively.

Only a partial production can thus in particular also be provided, or preliminary jobs for assembling a plug connector can be performed. The device or the method can also be provided as one individual of a plurality of components for producing a cable in the context of a superordinate production system.

In principle, the invention can be suitable for producing any arbitrary cable. The electrical cable in the state placed in the device can optionally, but not mandatorily, be considered to be part of the device.

The electrical cable can have a cable sheath. The cable sheath can be configured from a plastics material, for example from a thermoplastic polymer, in particular from a soft polyvinylchloride (PVC). All further cable components of the cable can preferably be encased by the cable sheath.

The electrical cable can have an outer conductor. The outer conductor can preferably be configured as a braided cable shield (also known under the term "braided shield") which has a plurality of interlaced individual wires. The individual wires of the braided cable shield can be configured as tin-plated copper wires, for example. The outer conductor can preferably run directly below the cable sheath; however, the outer conductor can also form a cable component lying further inside and also run directly below the cable film, for example.

The cable film of the electrical cable can be composed of a single material, in particular of a plastics material (for example, polyethylene terephthalate PET), of a metal (for example, aluminum or copper) or of a textile (for example, polyester). However, the cable film is preferably configured as a composite film and comprises at least two individual layers of dissimilar materials. The cable film can have, for example, exactly two individual layers or more individual layers, exactly three individual layers or more individual layers, exactly four individual layers or more individual layers, exactly five individual layers or even more individual layers. The composition of the individual layers can be arbitrary. For example, a composite film can be provided from a plastics material layer (for example, a PET layer) which on both sides is in each case bordered by a metal layer (for example, an aluminum layer). The cable film can preferably run directly below the outer conductor, in particular of a braided cable shield. The cable film can however also run through the cable directly below the cable sheath, for example, or at any other location.

The electrical cable can comprise exactly one inner conductor or a plurality of inner conductors, for example exactly two inner conductors or more inner conductors, exactly three inner conductors or more inner conductors, exactly four inner conductors or more inner conductors, exactly five inner conductors or more inner conductors, exactly six inner conductors or more inner conductors, exactly seven inner conductors or more inner conductors, exactly eight inner conductors or even more inner conductors. The invention can particular advantageously be suitable for use in a cable having a number of inner conductors which require an oval cable cross section, such as exactly two inner conductors, for example. An inner conductor can be configured as a single wire or as a strand having a plurality of individual wires, for example. The single wire or the individual wires of the inner conductor can be configured from a metal wire, for example from a tin-plated copper wire. The inner conductor or conductors, respectively, can preferably run below the cable film (conjointly with the insulation described hereunder).

The inner conductors can have a respective insulation or a common insulation which encases and electrically isolates the inner conductors. The insulation can be configured from a plastics material, for example from foamed polypropylene.

A plurality of inner conductors (conjointly with the respective insulations thereof) can run so as to be guided in parallel in the cable, or can run through the cable so as to be twisted or stranded, respectively. It can in particular be provided that two inner conductors form in each case one differential pair of inner conductors, said inner conductors running through the cable by way of a defined lay (measure of twist).

The electrical cable can optionally moreover have a filler layer ("filler") which encases a plurality of inner conductors, conjointly with the respective insulations thereof, in particular a filler layer from a plastics material.

The invention is particularly advantageously suitable for removing the cable film, or the end piece of the cable film, respectively, of electrical cables having a small cross section for the transmission of data, for example in the automotive sector, particularly preferably in the sector of electric mobility.

It can be provided that the cable film is at least partially exposed so as to enable the processing of the cable film by the film processing module. The cable film is preferably exposed in such a manner that said cable film is accessible at least in the region of the provided tearing position.

The provided tearing position is preferably a region having a minor axial extent which encircles the circumference of the cable film in a ring-shaped manner and at which region the cable film in the later course of the processing is to ideally tear in a controlled manner (in the manner of a predetermined breaking point) so as to sever a front end piece of the cable film.

For the device according to the invention it is provided that the film processing module has a circular knife for scoring at the tearing position at least one external layer of the cable film that faces away from the cable central axis.

The circular knife preferably has an encircling straight blade. As a result thereof, the cable film can be preferably cut and not sawn by the blade of the circular knife, as a result of which no (or at least negligible) shavings or burrs are created during the processing.

The cable film is preferably not fully cut through by the circular knife but only scored. In principle however, the cable film may also be fully cut through, but this is not preferable. Even when the score can optionally (partially or fully) extend beyond the external layer and through an underlying layer of the cable film, or even completely through the cable film, it can for reasons of application be advantageous to only treat the external layer of the cable film because the protective effect of the cable film can in this instance be used for protecting the components of the cable situated below the cable film during scoring.

The external layer can be one or a plurality of external material layers of a composite film. However, the external layer can also be a radially outer end region of an individual material layer of a composite film, or of a cable film that has only a single material layer.

A predetermined breaking point can preferably be incorporated in the cable film by the scoring. The predetermined breaking point can be incorporated by a material constriction (notch, perforation and/or scratch). The cable film under a corresponding stress can later break or tear, respectively, in a predictable manner as a result of the predetermined breaking point. The cable film can be weakened in a defined manner at the tearing position as a result of the predetermined breaking point, or the notch effect, respectively.

Whereas the scoring of a cable film using a straight knife or using a molding knife by virtue of the minor thickness of the cable film and of the tolerance-related cross-sectional geometry of the cable in practice can often lead to intolerable damage to cable components running below the cable film, it has been surprisingly demonstrated that the scoring of the cable film when using a circular knife can be controlled with high precision as a result of which undesirable damage to cable components can be avoided.

In an advantageous refinement of the invention it can be provided that the circular knife, in the absence of a drive, is mounted so as to be rotatable about a rotation axis in such a manner that the circular knife, while cutting along the circumference of the cable, rolls on the cable film.

As a result of the circular knife being able to roll on the cable film, the necessary cutting pressure which is introduced into the cable film by way of the circular knife during cutting can be reduced and moreover be adjustable in a highly precise manner.

A friction bearing or a roller bearing, for example a ball bearing, in particular a grooved ball bearing, can be provided for mounting the circular knife so as to be rotatable about the rotation axis thereof. An ideally low-friction mounting of the circular knife about the rotation axis thereof can be advantageous in order for the circular knife to be able to roll particularly easily during the cutting. The circular knife is preferably mounted so as to be rotatable about the rotation axis thereof in a friction-free or low-friction manner and/or completely about said rotation axis.

According to a refinement of the invention it can be provided that the film processing module has a cutting depth control and/or a cutting depth limitation for the circular knife. At least one cutting depth limitation can preferably be provided for the circular knife.

As a result of a cutting depth control and/or a cutting depth limitation, it can advantageously be ensured that the cable film is cut only down to an envisaged depth. It can be in particular ensured that the cable film is not completely cut through, as a result of which damage to cable components that run directly below the cable film can be avoided.

The cutting depth control and/or the cutting depth limitation can preferably be configured so as to limit the cutting depth as a function of the cross-sectional geometry of a cable component that directly encases the cable film, for example of the cable sheath.

For example, the cutting depth limitation can be guided in an encircling manner along the cable sheath of the cable while the circular knife scores the cable film. As a result thereof, the cutting depth during the radial movement of the circular knife about the cable central axis can be a direct function of the profile of the cable sheath and thus be adapted in an optimal manner to the cross section of the cable for each angular segment. It can be optionally provided here that the cutting pressure is limited in such a manner that the cutting depth limitation of the circular knife does not apply any excessive force on the cable sheath because a deformation of the cable, or of the cable sheath, can otherwise influence the cutting depth limitation in an unpredictable manner.

A cutting depth limitation can also be implemented by guiding the circular knife along a gate.

The cutting depth control can have one or a plurality of sensors (for example path sensors such as potentiometers, strain gauges, inductive sensors, capacitive sensors, or optical sensors such as laser distance sensors, and/or cameras) so as to detect continuously or at discrete points in time an actual depth of the circular knife in the cable film and/or a nominal depth of the circular knife while cutting. The items of information detected can ultimately be utilized for readjusting the spacing between the rotation axis of the circular knife and the cable central axis.

The cutting depth control is preferably specified for keeping the cutting depth of the score generated by the circular knife constant along the circumference of the cable.

According to a refinement of the invention it can be provided that the film processing module has a cutting pressure control and/or a cutting pressure limitation for the cutting pressure applied to the cable film by the circular knife. At least one cutting pressure limitation can preferably be provided for the circular knife.

The cutting pressure can be predefined and/or limited, for example, while using a linear actuator or an elastic element, in particular a spring (for example, a compression spring or a tension spring).

The cutting pressure control can have one or a plurality of sensors (for example, force transducers such as spring bellow force transducers, piezo force transducers, electrodynamic force transducers and/or resistive force transducers) so as to detect continuously or at discrete points in time an actual pressure and/or a nominal pressure for the circular knife while cutting. The items of information detected can ultimately be utilized for readjusting the cutting pressure.

The cutting pressure of the circular knife is preferably kept constant during the encircling scoring.

In a refinement of the invention it can be provided that the film processing module has a fixing installation which is specified for axially and/or radially fixing the cable.

By fixing the cable, the orientation of the cable during the scoring can be ensured, on the one hand, and twisting and/or displacing of the cable during the scoring avoided, on the other hand.

The fixing installation can have one or a plurality of clamping jaws which are actuatable in the direction toward the cable central axis.

In a refinement of the invention it can be provided that the film processing module has a guide bush having a through bore for guiding through the cable.

The cable can in particular be able to be guided, or be guided, respectively, through the through bore of the guide bush by way of the front end of said cable.

The guide bush is capable of stabilizing the cable during the scoring. The guide bush can moreover be configured for axially and/or radially fixing the cable; the guide bush can thus optionally be a component part of the fixing installation.

The cable is preferably received in the guide bush so as to be secured against rotation relative to the guide bush.

In an advantageous refinement of the invention it can be provided that the guide bush at an end that faces the circular knife has an end face. The end face can have a window for guiding through the cable (or the front cable end, respectively). The window can optionally have a geometry that is adapted to the cable (or to the front cable end which has already been pre-processed, for example relieved of the cable sheath and the outer conductor).

As a result of the guide bush at the end thereof that faces the circular knife having an end face, the circular knife during the radial actuation in the direction toward the cable central axis and/or during the scoring in the cable film can advantageously be guided along the end face. Cutting can thus preferably take place along the end face, or along the bush edge of the guide bush, respectively.

As a result of the guide bush on the end side having a window for guiding through the cable (or the front cable end thereof, respectively), in particular when the window is adapted to the external geometry of the cable, the cable can advantageously be secured against rotation, for example when the cable has an oval geometry, or an otherwise non-round geometry, respectively.

The orientation of the cable within the guide bush may be known, this being potentially advantageous for a uniform scoring of the cable film. The circular knife can optionally be guided along the external radius of the guide bush about the guide bush, so as to provide a cutting depth limitation.

In a refinement of the invention it can be provided that the film processing module has a rotational installation which is specified for rotating the cable about the cable central axis, and/or for rotating the circular knife along the circumference of the cable about the cable.

Preferably, either the cable is rotated about the cable central axis, or the circular knife is rotated along the circumference of the cable about the cable.

In the case of comparatively short pieces of cables it can be advantageous for the cable to be rotated about the cable central axis thereof, while the position of the circular knife remains unchanged. It has been demonstrated that the cutting pressure by virtue of the varying influence of the weight of the cutting knife in the rotation of the circular knife about the circumference of the cable can disadvantageously vary. In contrast, in the case of comparatively long cables, it can be easier for the circular knife to be rotated about the cable; the effect of gravity can preferably be taken into consideration here and compensated for (for example by guiding the circular knife along a gate by way of a distance, the profile of the latter being chosen in such a manner that the varying influence of gravity is compensated for).

In an advantageous refinement of the invention it can be provided that the rotational installation is specified for rotating the fixing installation and/or the guide bush conjointly with the cable about the cable central axis.

The cable can preferably be axially and/or radially fixed within the guide bush. A rotation of the cable about the central axis thereof can thus particularly advantageously take place by rotating the guide bush.

In an advantageous refinement of the invention it can be provided that a separating module for separating a piece of cable film, or an end piece of the cable film, respectively, at the tearing position is provided downstream of the film processing module.

As a result of the film processing module having weakened in a defined manner the mechanical load-bearing capability of the cable film at the provided tearing position, subsequent severing of the end piece of the cable film can take place in a particularly simple and precise manner. By virtue of the pre-processing of the cable film by the film processing module, a separating module can thus be advantageously used in the context of an automated cable production.

The separating module can have means for twisting and/or bending the cable, the cable film and/or the end piece of the cable film. As a result thereof, the notch/predetermined breaking point, or the score, respectively, that has previously been incorporated at the provided tearing position can be extended until the cable film ultimately completely tears off at the tearing position.

In an advantageous refinement of the invention it can be provided that the separating module has a gripping tool which is specified for gripping the end piece of the cable film to be severed adjacent to the tearing position.

A gripping tool can particularly advantageously be able to be used for removing or tearing off, respectively, the end piece of the cable film.

The gripping tool is preferably specified for gripping exclusively the end piece of the cable film. The gripping tool is particularly preferably specified for gripping the end piece of the cable film in the region of a front end portion.

In a refinement of the invention it can be provided that the gripping tool has two gripping jaws which are actuatable in the direction toward the cable central axis. In principle, more than two gripping jaws, for example three gripping jaws or more gripping jaws, or four gripping jaws or even more gripping jaws, can also be provided.

The gripping jaws can be actuatable in a linear movement toward the cable central axis. The gripping jaws can however also be actuatable in a curved movement toward the cable central axis.

The gripping jaws can be disposed on the respective clamping legs. The clamping legs can optionally be mounted in a common pivot point.

The clamping force by way of which the clamping tool fixes the cable, the cable film and/or the end piece of the cable film can be limited or controlled.

According to a refinement of the invention it can be provided that the separating module has an actuator installation which is specified for twisting and/or bending the cable conjointly with the cable film in such a manner that the end piece of the cable film is severed at the tearing position.

The actuator installation can have, for example, one, two, three, four or more tappets which are actuatable toward the cable so as to bend the cable conjointly with the cable film. The actuator installation can also have, for example, at least one eccentric so as to bend the cable conjointly with the cable film.

The actuator installation can be specified for bending the cable, conjointly with the cable film, along at least one degree of freedom, preferably along at least two degrees of freedom.

In an advantageous refinement of the invention it can be provided that the actuator installation is specified for tilting the gripping tool along at least one degree of rotational freedom (relative to the cable central axis), while the gripping tool fixes the cable, or the cable film, or the end piece of the cable film, respectively.

A mechanical stress of the cable film at the tearing position can be particularly advantageously introduced into the cable or into the cable film/the end piece of the cable film by way of the gripping tool. The actuator installation can thus be advantageously coupled to the gripping tool, for example to the gripping jaws or the clamping legs.

Moreover, the closed gripping tool can even increase the mechanical stress on the cable film initiated by the twisting and/or bending, because a compensation of the length of the path of the cable film that varies as a result of the twisting/bending is prevented, as a result of which the tearing of the cable film can take place in a complete and reliable manner already at minor deflections.

It can be provided that the separating module, alternatively or additionally to the gripping tool and/or to the actuator installation, has even further means for severing the end piece of the cable film along the provided tearing position. For example, a sonotrode can be used for introducing high-frequency mechanical vibrations into the cable, or into the cable film, respectively, and for setting the cable, or the cable film, respectively, in resonance vibration. Alternatively or additionally, vibration promoters and other vibration installations can also be provided for initiating and/or at least facilitating the severing of the end piece of the cable film. An air flow, for example as a result of pulse controlled compressed air (suctioning and/or blowing) can also be provided for severing the end piece of the cable film at the tearing position that has previously been mechanically weakened by the circular knife.

It can be provided that the end piece of the cable film, upon severing by the separating module, is stripped conjointly with the guide bush from the cable. The end piece of the cable film can however also be removed from the cable in that the end piece is brushed off, blown off, unwound, wiped off and/or stripped conjointly with a previously partially stripped piece of the cable sheath.

In an advantageous refinement of the invention it can be provided that a cleaning module for removing particles or film remnants adhering to the cable is provided downstream of the separating module.

The use of the cleaning module can ensure a high quality of production and preclude sources of defects in the finished product (in particular shorting by metallic foil particles, mechanical blockages and leakages). The technical cleanliness in the context of the production of the electrical cable can be ensured by the cleaning module.

In principle, the cleaning process can be realized or implemented, respectively, in different ways. However, arbitrary combinations of the variants hereunder, or else optionally individual solutions, are particularly suitable.

According to a design embodiment it can be provided that the cleaning process comprises blowing-off the particles or film remnants, respectively. For example, particles and film remnants can be blown off using a strong air jet. According to a design embodiment it can be provided, for example, that the electrical cable is introduced into an annular nozzle, whereupon the particles or film remnants, respectively, are blown off by means of the annular nozzle. The annular nozzle can have one or a plurality of inflows for the supply of air. For example, a single inflow can be provided, or two inflows can be provided. It can be provided that the annular nozzle has a plurality of individual air outlets/nozzles or one air outlet in the manner of an annular gap which is completely or at least partially encircling in a ring-shaped manner. Even though an annular nozzle is particularly preferable, a conventional air nozzle, or a plurality of air nozzles, can also be provided in order to be able to remove the particles or film remnants, respectively, in a more targeted manner and with greater flexibility. A flat-jet nozzle can be provided, for example.

In order to avoid that the particles or film remnants, respectively, are rejected in an uncontrolled manner and thus migrate to another location of the production line, for example, it can be advantageous for the particles or film remnants, respectively, to be blown off in a targeted manner onto a collection container and/or onto a filter unit.

In an advantageous design embodiment it can be provided that the cleaning process comprises suctioning of the particles or film remnants, respectively. A round nozzle, a flat-jet nozzle or any other nozzle can be provided for suctioning.

In a design embodiment it can be provided that an air flow generated in the context of the cleaning process is pulse-controlled. A pulse-controlled air flow can be suitable for blowing off and/or for suctioning, for example. As a result of the pulsed air jet, the particles or film remnants, respectively, can be more readily removed from the surface because said particles or film remnants are initially loosened. Moreover, a turbulent air flow which facilitates the release of the particles or the film remnants, respectively, from the electric cable or from the components that in the context of the production are attached to the cable can be created as a result of the pulsed action.

In an advantageous design embodiment it can be provided that ionized air is supplied to the cable end during the cleaning process so as to reduce the electrostatic attractive force of the particles or film remnants, respectively. The targeted reduction of the electrostatic charge can be particularly advantageous for removing particles or film remnants, respectively, of a plastics material.

In order to be able to dissipate charges from the particles or film remnants, respectively, and/or from the cable, for example the components of the device that in the context of the production come into direct contact with the particles or the film remnants, respectively, can be configured so as to be conductive and grounded (for example the brushes which are yet to be described hereunder).

In one design embodiment it can be provided that the cable end during the cleaning process is exposed to defined vibrations so as to loosen the particles or film remnants, respectively. Microscopic hooks can be released by the vibrations, and the particles and film remnants, respectively, can subsequently be more easily removed. For example, a vibration method can be particularly suitable in combination with blowing-off or suctioning the particles. It can be advantageous for the vibrations to be introduced as close as possible to the contamination.

In a design embodiment it can moreover be provided that magnetic particles, or magnetic film remnants, respectively, are removed by magnetic attractive force while using one or a plurality of magnets (permanent magnets and/or solenoids).

According to a refinement of the invention it can be provided that a quality monitoring module for checking the processing quality of the cable is provided downstream of the separating module.

Ideally comprehensive quality monitoring can be particularly advantageous in the context of a fully automated or partially automated production of cables in the context of volume manufacturing. For example, as a result of quality monitoring the cable production can be designed so as to be transparent and retraceable to the end user. It can be provided that monitoring of the state of at least one cable end of the cable takes place after the removal of the end piece of the cable film, in particular after preceding cleaning by the cleaning module.

The quality monitoring module can in principle also be provided at another location or at a plurality of locations of the cable processing. For example, a quality monitoring module, or at least a visual check of the cable end, can also be disposed upstream of a processing module or of a plurality (or all) of the processing modules of the device. For example, at least one optical sensor can be disposed in a receiving region of the processing module, as a result of which the cable end, while the latter is actuated into the processing module, can be checked by the quality monitoring module or by the optical sensor.

The state of the cable end can be detected by means of an optical sensor installation for optical quality monitoring. Different quality features can advantageously be utilized by an optical quality monitoring.

The result of the processing of the cable film can in particular be checked in the context of the quality monitoring of the quality monitoring module. For example, it can be checked whether a score has taken place in a cable component that runs below the cable component, for example the insulation of an inner conductor. It can furthermore be checked whether cutting remnants project from the cable film remaining on the cable in the region of the tearing position, or adhere to any other cable component. It can finally also be checked whether the cable film remaining on the cable has projecting corners in the region of the tearing position, or the accuracy/the profile of the separation location can be checked, respectively.

If required, the checked cable can be diverted from the production or marked for post-processing, should the checked cable not have the required quality. The result of the quality monitoring can optionally be recorded or stored so as to be able to be assigned to the cable, respectively, on the cable, on a workpiece carrier assigned to the cable, and/or in a database.

In an advantageous design embodiment of the quality monitoring module it can be provided that the line of vision of a first optical sensor is aligned toward the cable end, wherein a first illumination unit along the line of vision of the first sensor is disposed behind the cable end so as to generate transmitted light for detecting the state of the cable end.

The line of vision of the optical sensor is preferably a central axis of the optical detection range or the detection lobe by way of which the sensor detects or perceives the environment thereof, respectively.

According to a design embodiment of the quality monitoring module it can moreover be provided that the line of vision of a second optical sensor is aligned toward the cable end, wherein a second illumination unit along the line of vision of the second sensor is disposed in front of the cable end so as to generate incident light for detecting the state of the cable end.

According to a design embodiment of the quality monitoring module it can be provided that the first optical sensor and/or the second optical sensor are/is configured as a camera (preferably as an electronic camera) or have/has a camera. The optical sensors, in particular the cameras, can be configured and specified for recording at least a single image, preferably a plurality of single images, or a video sequence, for example. The single images or the video sequence can subsequently be evaluated by a control installation.

In a design embodiment of the quality monitoring module it can be provided that the second optical sensor is disposed so as to be offset by a defined angle from the first optical sensor, preferably is disposed so as to be offset by 10° to 170°, particularly preferably is disposed so as to be offset by 45° to 135°, furthermore preferably is disposed so as to be offset by 80° to 100°, and most particularly preferably is disposed so as to be offset by 90°. The first optical sensor and the second optical sensor are most particularly preferably in each case aligned so as to be orthogonal to the cable central axis, or the longitudinal axis of the electrical cable, respectively, and so as to be mutually offset by approximately 90° or exactly 90°. A simultaneous detection of the cable by both optical sensors can in particular take place in a comparatively disturbance-free manner, or independent manner, respectively, as a result.

In a design embodiment of the quality monitoring module it can be provided that the first illumination unit emits light in a first light color and/or in a first light polarization, the latter being predominantly to exclusively detectable by the first optical sensor and predominantly not to not detectable by the second optical sensor. As a result of the light of the first illumination unit being predominantly to exclusively detectable by the first optical sensor, the quality monitoring by the first optical sensor and the first illumination unit preferably does not influence the quality monitoring by the second optical sensor.

In an advantageous design embodiment of the quality monitoring module it can moreover be provided that the second illumination unit emits light in a second light color and/or in a second light polarization, the latter being predominantly to exclusively detectable by the second optical sensor, and predominantly not to not detectable by the first optical sensor.

In a design embodiment of the quality monitoring module it can be provided that the first optical sensor and the second optical sensor carry out temporally offset measurements, wherein the first illumination unit illuminates the cable end only at temporal intervals during which the first optical sensor carries out the measurement, and wherein the second illumination unit illuminates the cable end only at temporal intervals during which the second optical sensor carries out the measurement.

In an advantageous design embodiment of the quality monitoring module it can be provided that the first optical sensor and/or the second optical sensor while detecting the state of the cable end are/is rotated about the cable central axis of the cable, and/or that the cable is rotated about the cable central axis while the first optical sensor and/or the second optical sensor detect/detects the state of the cable end. A particularly precise detection of the processing state of the corresponding cable end can take place as a result. It can in particular be provided that the first illumination unit is rotated in a manner synchronous with the first optical sensor, and/or that the second illumination unit is rotated in a manner synchronous with the second optical sensor. The first sensor can moreover also be rotated so as to be synchronous with the second sensor. For example, both sensors and both illumination units can be fastened to a common frame.

In an advantageous refinement of the invention it can be provided that a cable shield processing module for cutting to length and/or folding back a braided cable shield of the cable, which proceeding from a front cable end, is exposed up to a stripping position, is provided upstream of the film processing module.

In principle, the cable shield processing module for cutting to length and/or folding back the braided cable shield of the cable can also be disposed downstream of the film processing module, as long as the braided cable shield is disposed below the cable film.

The stripping position can in particular be a position along the cable central axis of the cable from which the cable sheath of the cable is stripped. The stripping position can thus in particular be the axial position along the cable central axis of the cable from which the cable sheath, proceeding from the front cable end, is again present.

In an advantageous refinement of the invention it can be provided that the cable shield processing module has at least one drivable brush which, proceeding from the front cable end of the cable, is specified for folding back the braided cable shield of the cable in the direction toward a cable end lying opposite the front end by brushing.

Brushing the braided cable shield for folding back the braided cable shield can be particularly advantageously suitable for different cable types or cable geometries, respectively, and thus also lead to a positive outcome independently of the specific type of the cable. The "brushing back" of the braided cable shield can even be positively suitable in the case of oval cable geometries, for example in the case of data lines having a number of inner conductors, where the inner conductors cannot be symmetrically distributed in the cable (for example, in the case of a data cable having exactly two inner conductors).

In an advantageous design embodiment at least two drivable brushes or more brushes, at least three drivable brushes or more brushes, at least four drivable brushes or even more brushes can be used. A comprehensive processing of the braided cable shield can take place as a result of the brushes being distributed along the circumference of the cable. The use of exactly two brushes is particularly preferable because it has been demonstrated by means of test series that an adequate brushing result for folding back the braided cable shield can be obtainable already by using two brushes. In principle however, even more brushes can be provided. The use of only a single brush can optionally also be provided.

It can optionally be provided that the cable during brushing is rotated about the cable central axis and/or that the at least one brush during brushing is rotated about the circumference of the cable so as to ideally guarantee processing across the entire circumference. Rotating the cable/the brush (es) can be particularly advantageous in the case of a minor number of brushes.

In a design embodiment it can be provided that the at least one drivable brush prior to and/or during brushing is actuated in the direction toward the cable central axis of the cable.

In a design embodiment it can moreover be provided that the braided cable shield during brushing, or during the folding back of the braided cable shield, respectively, is moved along the at least one brush (for example so as to pass through between the brushes), and/or that the at least one brush is moved across the cable along the cable central axis of the cable.

In a design embodiment it can be provided that the brushes are configured as round brushes. A round brush can be understood to be any brush which can be driven about a central axis, for example also so-called pot brushes and conical brushes. The round brushes do not have to be completely round, but can also be configured so as to be oval, for example. In principle, arbitrary brushes can be provided, for example also brushes which carry out a linear movement, or revolving brushes. It can be provided that the brushes have nylon bristles. In principle however, arbitrary bristles can be suitable, for example also bristles from natural fibers, from man-made fibers or from wire. The person skilled in the art can select bristles which are suitable for brushing the braided cable shield based on the application and as a function of the material of the braided cable shield.

It can be provided that the cable during brushing, or during folding back of the braided cable shield, respectively, is fixed so as to be secured against rotation, for example by means of the fixing installation. Axial securing of the electrical cable, for example by means of the fixing installation, is also possible in a permanent manner or only during specific processing steps.

It can be provided that the cable shield processing module has a control installation which is specified for determining a defined folding-back position for the braided cable shield along the cable central axis.

The folding-back position is the position along the cable central axis of the cable, proceeding from which the braided cable shield is folded back, or kinked for folding back, respectively. The folding-back position can in particular be the reversal point of the profile of the folded-back braided cable shield, where the braided cable shield reverses the profile thereof in the direction toward the rear cable end.

It can be provided that the cable shield processing module has an actuating installation which is specified for attaching a mold shell to the cable and for positioning said mold shell at the folding-back position by way of a front end that faces the front cable end.

The shape of the folding region of the braided cable shield can advantageously be predefined by the mold shell. Moreover, the flexibility when folding back the braided cable shield can be increased as a result of the use of the mold shell, because the braided cable shield no longer has to be mandatorily folded back directly onto the cable, or onto the cable sheath of the latter, respectively, or onto a plug connector component of the later plug connector.

For example, when a support sleeve of the later plug connector that has been pre-assembled on the cable has an axial elongate slot, it can arise in practice that individual wires of the braided cable shield when being folded back invade the elongate slot and, as a result of the gained length associated therewith, protrude in an undefined manner beyond the rear end of the support sleeve. This is to be avoided in order to guarantee positive electrical characteristics and to avoid shorting in the context of the assembly of the plug connector.

The radial distance, or the spacing of the folded-back braided cable shield from the cable sheath of the cable, or from a plug connector component of the plug connector that is preassembled on the cable sheath, can be predefined or influenced, respectively, as a result of the mold shell.

Moreover, as a result of the mold shell, the axial folding-back position along the cable central axis can also be predefined by positioning the front end of the mold shell.

In a design embodiment it can be provided that the mold shell is independent of an electrical plug connector that is to be assembled on the cable end to be processed. The mold shell is thus preferably not a component part of the later plug connector. The mold shell is preferably only a component part of the cable shield processing module and can thus be advantageously used for folding back the braided cable shield. In an advantageous design embodiment it can be provided that the mold shell is removed from the cable again once the braided cable shield has been folded back onto the mold shell. The mold shell can preferably be removed from the cable in a non-destructive manner.

In an advantageous design embodiment of the invention it can be provided that the mold shell has a round cross section. In principle however, the mold shell can also have an oval, a rectangular, or any other cross section. The geometry here can preferably correspond, or at least correspond approximately, to the geometry of the cable sheath, or correspond, or at least correspond approximately, to a plug connector component that is to be assembled on and/or below the folded-back braided cable shield. Since the plug connector components that are to be assembled on or below the braided cable shield typically have a round internal or external geometry, a round mold shell is typically advantageous.

In a design embodiment it can be provided that the mold shell tapers in the direction toward the front end. The mold shell can also taper only in portions. As a result thereof, for example after the folding back, further plug connector components, or a die for cutting the braided cable shield, proceeding from the rear cable end, can be pushed particularly easily below the braided cable shield.

The mold shell can taper along an angle of 20° to 70°, for example, preferably along an angle of 30° to 60°, particularly preferably along an angle of 40° to 50°, for example 45°.

Particularly preferably however, the mold shell does not taper and, in contrast, is configured for completely folding back the braided cable shield to the rear, optionally even for folding back said braided cable shield over a convexity on the end side of the mold shell. This variant is particularly suitable when the braided cable shield after the folding back no longer has to be cut, for example when the dimensions of the plug connector have already been adapted to the length of the braided cable shield remaining after stripping and folding back.

According to a design embodiment it can furthermore be provided that the mold shell is configured from two half shells or more half shells which are actuated in the direction toward the cable central axis so as to attach the mold shell to the cable. The mold shell can however also be integrally configured, in particular in the manner of a tube.

In an advantageous design embodiment it can be provided that the mold shell is attached to the cable over a plug connector component of an electric plug connector that is pre-assembled on the cable, preferably above an (axially slotted) support sleeve of the plug connector. The mold shell can thus cover the plug connector component of the later plug connector, for example the axially slotted support sleeve of the plug connector, during the brushing of the braided cable shield. Disadvantageous contours and regions of the plug connector component, for example an axial elongate slot, can thus no longer negatively influence the folding-back of the braided cable shield. Moreover, the plug connector components can be protected against the rotating brushes by the mold shell.

In a refinement of the invention it can be provided that the folding-back position deviates from the stripping position.

The folding-back position can thus be advantageously varied independently of the stripping position. As a result, tolerances at the stripping position or at the assembly position of a plug connector component can for example be taken into account and compensated for. Moreover, it has surprisingly been demonstrated that the contacting of the braided cable shield by a plug connector component, for example a support sleeve or a crimp sleeve, can be improved when the folding-back position of the braided cable shield does not correspond directly to the stripping position.

In an advantageous design embodiment it can be provided that the folding-back position is determined in such a manner that the folding-back position along the cable central axis of the cable is disposed so as to be closer to the cable end to be processed than the stripping position. The folding-back position along the cable central axis can thus be farther toward the "front" than the stripping position. A spacing from the stripping position can thus be adhered to when the braided cable shield is folded back. This can be particularly advantageous in terms of the assembly of a plug connector for the high-frequency engineering sector, because the contacting of an outer conductor contact of the plug connector by way of the braided shield of the cable can then take place further toward the front on the cable. In principle however, it can also be provided that the folding-back position corresponds to the stripping position. Even a folding-back position that is offset toward the rear so as to be behind the stripping position can be provided in special cases, for example in order for the braided cable shield to be folded back in stages.

According to a design embodiment it can be provided that the folding-back position is determined as a function of an assembly position of a plug connector component of an electrical plug connector that is preassembled on the cable. As a result, tolerances at the assembly position of the plug connector component can be compensated for. As a result thereof it can in particular be avoided that the folded-back braided cable shield protrudes rearward beyond the plug connector component, even when the assembly position of the plug connector component along the cable central axis is subject to large tolerances.

According to a design embodiment it can be provided that the folding-back position is determined as a function of the stripping position. For example, it can be provided for the folding-back position to be established at a defined spacing from the stripping position, for example to be established so as to be offset from the stripping position by 0.1 mm to 5.0 mm, preferably established so as to be offset from the stripping position by 0.1 mm to 2.0 mm, most particularly preferably established so as to be offset from the stripping position by 0.1 mm to 1.0 mm.

In an advantageous refinement of the invention it can be provided that the mold shell has an end-side detent face for the braided cable shield.

An end-side detent face of the mold shell can improve contacting of the braided cable shield by, for example, a support sleeve, a press-fit sleeve or a crimp sleeve, or any other plug connector component, because the folded-back braided cable shield in this instance follows the profile of the detent face and can configure "sprung", or elastic, respectively, end-proximal contacting by the plug connector component.

The end-side detent face of the mold shell preferably configures a defined edge for folding back the braided cable shield. In a design embodiment it can be provided that the end-side detent face of the mold shell at least in portions runs so as to be orthogonal to the cable central axis when the mold shell is attached to the cable.

However, a non-orthogonal alignment of the end-side detent face, for example an arbitrary angular alignment of the detent face in relation to the cable central axis, can also be provided.

In an advantageous design embodiment it can be provided that the mold shell at the front end has a chamfer and/or a transition radius, preferably between the end-side detent face and a lateral face of the mold shell. A chamfer and/or a transition radius can further improve the brushing result when folding back the braided cable shield, and moreover reduce the stress on the braided cable shield by sharp kinking.

According to a refinement of the invention it can be provided that the cable shield processing module has a die having a contact area for the braided cable shield and a stamping installation, wherein the stamping installation is capable of severing the braided cable shield bearing on the contact area of the die.

The die can have a through bore for guiding through the cable. The die can be actuatable along the cable central axis in the direction toward the front cable end so as to bring to bear the braided cable shield on the end side of the contact area, said braided cable shield in the context of the cable shield processing having previously been at least partially folded over. The die can thus serve as a contact area for a subsequent shearing cut.

A shearing cut or a stamping cut can be carried out by means of the stamping installation. If required, a fine cut can subsequently take place so as to reliably sever all individual wires of the braided cable shield.

The production of the cable can advantageously be divided among individual processing steps and/or processing modules, for example among the processing modules mentioned above and hereunder.

The distribution of the production among a plurality of processing modules or processing steps enables the device to be operated as a "production line process", or as a "cycled robot", respectively, having successive individual steps so as to reduce the processing time in volume processing.

The device can furthermore be of a modular construction, as a result of which individual processing modules can be replaced, modified or removed without great complexity. As a result, the device can in particular be able to be configured with simple means for processing different types of cables.

The device according to the invention can optionally also have exclusively the film processing module and otherwise have no further processing modules.

The invention also relates to a method for producing an electrical cable having a cable film. In the context of the method it is provided that the mechanical load-bearing capability of the cable film is reduced at a tearing position provided along a cable central axis. To this end, at least one external layer of the cable film that faces away from the cable central axis is scored at the provided tearing position by means of a circular knife.

The circular knife can be part of a film processing module, in particular of the film processing module of the device according to the invention described above and hereunder.

According to a refinement it can be provided that the cable film is scored at least in a partially ring-shaped manner, completely or in portions along the circumference of the cable.

For example, it can be provided that the mechanical load-bearing capability is reduced in a symmetrically encircling manner along the circumference of the cable film. Additionally or alternatively it can also be provided that the mechanical load-bearing capability of the cable film along the cable central axis is reduced completely or in portions in the region of the cable portion to be processed.

In an advantageous refinement it can be provided that the cable film at the tearing position is scored in such a manner that a tear through the external layer and preferably at least partially also through an internal layer of the cable film that is situated below the external layer is configured.

For example, it can be provided that a tear in a partially ring-shaped manner, completely or in portions encircling along the circumference of the cable film and/or along the cable central axis, is incorporated only in the external layer or in part of the external layer. It can however also be provided that a tear in a partially ring-shaped manner, completely or in portions encircling along the circumference of the cable film and/or along the cable central axis is incorporated in the radial direction completely through the cable film, that is to say through the external layer and through the internal layer. A tear which only partially penetrates the internal layer of the cable film is also possible.

A tear in the cable film can represent a suitable predetermined breaking point, or reduce the mechanical load-bearing capability of the cable film at the tearing position to a desired extent. The type of the tear, that is to say the length, the depth and the width, and optionally also the number of tears, can be established so as to be specific to the application by the person skilled in the art.

In an advantageous design embodiment of the invention it can be provided that the circular knife while cutting along the circumference of the cable rolls on the cable film.

In a refinement of the invention it can moreover be provided that the cutting depth and/or the cutting pressure of the circular knife while scoring along the circumference of the cable is controlled or at least limited.

According to a design embodiment of the invention it can be provided that the cable during the processing, in particular during the scoring of the cable film, is axially and/or radially fixed.

According to a design embodiment of the invention it can be provided that the front cable end prior to the scoring of the cable film is guided through a through bore of a guide bush.

In a design embodiment of the invention it can be provided that the cable is rotated about the cable central axis and/or that the circular knife is rotated along the circumference of the cable about the cable while the cable film is scored by the circular knife. The guide bush can preferably be rotated conjointly with the cable about the cable central axis.

According to a refinement of the invention it can moreover be provided that the cable upon reducing the mechanical load-bearing capability is twisted and/or bent in such a manner that an end piece of the cable film is severed in a partially ring-shaped or ring-shaped encircling manner along the tearing position.

In an advantageous design embodiment of the invention it can be provided that the end piece of the cable film to be severed is held adjacent to the tearing position, for example by means of a gripping tool.

It can be provided that one, two, three, four or more actuators (in particular linear motors or driven cylinders) and/or at least one eccentric are used in order for the cable portion to be processed to be twisted and/or bent along at least one degree of freedom. It can in particular be provided that the end piece of the cable film during the twisting and/or bending is fixed in the region of the tearing position, in particular by means of the gripping tool already described.

In principle, a plurality of cable films can also be provided within an electrical cable; for example, a first cable film can be provided between the cable sheath and the braided cable shield, and a second cable film can be provided between the dielectric or an insulation, respectively, and an inner conductor. The invention can also be used for removing a plurality of cable films, or pieces of cable film, respectively, from an electrical cable.

The device described can furthermore also have even further processing modules, or the method described can also provide even further processing steps. The previously mentioned processing modules or method steps, respectively, can be combined or divided in an arbitrary manner as well as rearranged in terms of their sequence (as long as technically expedient) and be upgraded with further processing modules or method steps, respectively.

For example, a cable sheath processing module can be provided for stripping the cable sheath of the cable. To this end, the cable sheath can be scored in a preferably completely ring-shaped encircling manner so as to sever a piece of the cable sheath. It can however also be provided for the sheath to be scored only in a partially ring-shaped manner or in portions in a ring-shaped encircling manner, and to initially still leave behind individual connecting webs, for example. It can be provided that the cable sheath processing module, upon severing the piece of the cable sheath, is configured for carrying out partial stripping of the piece of the cable sheath from the cable. The piece of the cable sheath can at least be partially stripped from the cable film or from the braided cable shield in an axial direction along the cable central axis.

For example, a mounting module for mounting at least one plug connector component, for example a support sleeve, on the cable can also be provided. The plug connector component can also be, for example, a seal ring. The plug connector component, proceeding from the front cable end, can be pushed onto the cable in the axial direction along the cable central axis by the mounting module. Optionally, the plug connector component, in particular a support sleeve, can be press-fitted or crimped, respectively, on the cable (for example on the cable sheath of the cable).

According to an advantageous design embodiment of the invention, a transport installation for successively actuating the cable portion of the cable to be processed toward the processing modules can moreover be provided. The transport installation can in particular be configured in the manner of a production line and transport at least one cable from one processing module to the next processing module. However, the transport installation preferably transports in each case a plurality of cables from one processing module to the next processing module so as to feed a respective cable for processing the latter simultaneously to a plurality of processing modules such that ideally all processing modules are always busy in order to achieve a high throughput. The transport installation can optionally have one or a plurality of grippers so as to actuate one or a plurality of cables.

The invention also relates to a computer software product having program code means for carrying out a method according to the embodiments above and hereunder when the program is executed on a control unit of a device for producing a cable.

The control unit can be configured as a microprocessor. Instead of a microprocessor, any arbitrary further installation for implementing the control unit can also be provided, for example one or a plurality of assemblies of discrete electronic components on a circuit board, a programmable logic controller (PLC), an application-specific integrated circuit (ASIC), or any other programmable circuit, for example also a field programmable gate array (FPGA), a programmable logic assembly (PLA), and/or a commercially available computer.

The invention also relates to an electrical cable, processed by a method according to one of the embodiments above and hereunder.

The invention moreover relates to an electrical cable which has been processed by a device according to the embodiments above and hereunder.

The invention can be particularly advantageously suitable for producing a cable for the transmission of data (data line), in particular for the high-frequency engineering sector.

Features which have been described in the context of the device according to the invention can of course also be advantageously implemented for the method, and vice versa. Furthermore, advantages which have already been mentioned in the context of the device according to the invention, can also be understood to relate to the method, and vice versa.

It is to be additionally pointed out that terms such as "comprising", "having" or "with" do not preclude any other features or steps. Furthermore, terms such as "a/one" or "the", which suggest a singularity of steps or features, do not preclude a plurality of steps or features, and vice versa.

In a puristic embodiment of the invention, it may however also be provided that the features introduced in the invention by the terms "comprising", "having" or "with" constitute an exhaustive list. Accordingly, in the context of the invention, one or more enumerations of features can be considered in self-contained form, for example respectively for each claim.

Note that terms such as "first" or "second" etc. are used predominantly for the sake of distinguishability between respective device or method features, and are not imperatively intended to indicate that features are mutually dependent or relate to one another.

It is furthermore emphasized that the values and parameters described in the present case also encompass deviations or fluctuations of ±10% or less, preferably ±5% or less, more preferably ±1% or less, and very particularly preferably ±0.1% or less, of the respectively stated value or parameter, if such deviations are not ruled out in practice in the implementation of the invention. The specification of ranges by way of start and end values also encompasses all values and fractions encompassed by the respectively stated range, in particular the start and end values and a respective mean value.

It is to be mentioned at this point that the specific combinations of features, mentioned in the dependent claims, in particular the processing modules described, can per se also represent independent inventions in the context of the production of the electrical cable.

The applicant in particular, but not exclusively, reserves the right to claim the following subjects as independent inventions:

a) a device (and a corresponding method) for producing an electrical cable having a cable film, having a film processing module for reducing the mechanical load-bearing capability of the cable film at a tearing position provided along the cable central axis, wherein the film processing module has a knife (in particular a straight knife) or a molding tool for scoring at least one external layer of the cable film that faces away from the cable central axis at the tearing position;

b) a device (and a corresponding method) for producing an electrical cable having a cable film, said device having a separating module for severing an end piece of the cable film at a tearing position provided along the cable central axis;

c) a device (and a corresponding method) for producing an electrical cable having a cable film, said device having a cleaning module for removing particles or film remnants adhering to the cable;

d) a device (and a corresponding method) for producing an electrical cable having a cable film, said device having a quality monitoring module for checking the processing quality of the cable; and/or e) a device (and a corresponding method) for producing an electrical cable having a cable film, said device having a cable shield processing module for cutting to length and/or folding back a braided cable shield of the cable that, proceeding from a front cable end, is exposed up to a stripping position.

The features disclosed in the entire description and the drawing relate to advantageous embodiments and variants of the above-mentioned, independent inventions.

Exemplary embodiments of the invention will be described in more detail hereunder by means of the drawing.

The figures show in each case preferred exemplary embodiments in which individual features of the present invention are illustrated in combination with one another. Features of one exemplary embodiment can also be implemented independently of the other features of the same exemplary embodiment and can accordingly be readily combined with features of other exemplary embodiments by a person skilled in the art so as to form further expedient combinations and sub-combinations.

Elements of identical function are denoted by the same reference designations in the figures.

In the figures, in each case schematically:

Figure 1:
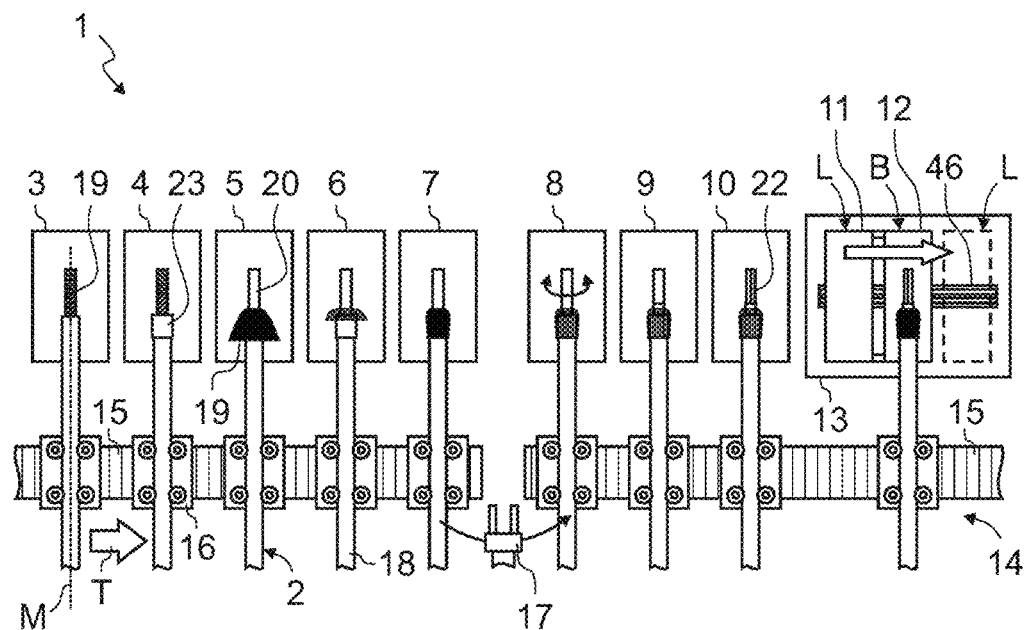
FIG. 1 shows a device according to the invention for producing an electrical cable, having a transport installation and having a plurality of processing modules.

FIG. 1 shows a device 1 for producing an electrical cable 2. The device 1 is illustrated only in a highly schematic and exemplary manner.

In the context of the production, the electrical cable 2 can be prepared for assembling an electrical plug connector (not illustrated) on the cable end to be processed (presently also referred to as the front cable end). In the context of the production, plug connector components of the later plug connector can also be already pushed onto the cable end to be processed or assembled on the cable end. In the context of the production, the plug connector can optionally also be completely assembled on the cable end to be processed. Both cable ends can optionally also be produced.

The device 1 illustrated in FIG. 1 in an exemplary manner has a plurality of processing modules 3 to 12 which are in each case indicated as a black box. Two processing modules 11, 12 in an exemplary manner combine so as to form a module group 13. The latter will yet be discussed in more detail hereunder.

The device 1 has a transport installation 14 for actuating the cable 2 to be processed along a transport direction T to the processing modules 3 to 12, or to the module group 13, respectively. The transport installation 14 can have one or a plurality of conveyor belts 15 for transporting the cable 2 in a workpiece carrier 16. The workpiece carrier 16 can optionally be configured for actuating the cable 2 orthogonally to the transport direction T into the respective processing module 3 to 12, or into the module group 13, respectively. The transport installation 14 can also have a roller conveyor in order to ensure that the cable 2 is transported with ideally low friction, wherein a production operator can optionally manually move the cable 2 between the individual processing modules 3 to 12. The transport installation 14 can also have one or a plurality of gripper units having at least one gripper 17 so as to convey the cable 2 individually or in the workpiece carrier 16 between the processing modules 3 to 12 or module groups 13.

The processing modules 3 to 12 and/or module groups 13 can be cycled in a synchronized manner so as to provide an ideally efficient production line for the production of the cable 2.

Figure 2:
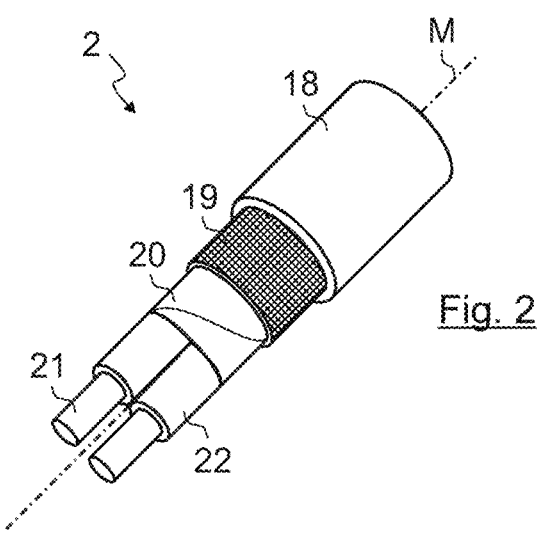
FIG. 2 shows a perspective illustration of an exemplary electrical cable to be produced.

In principle, the device 1 according to the invention is suitable for producing any arbitrary cable 2. The invention is however particularly advantageously suitable for producing an electrical cable 2 of the type as is illustrated in FIG. 2. Accordingly, the invention hereunder will be described substantially for producing a two-core shielded data cable; this however is not to be understood as limiting.

The electrical cable 2, illustrated in an exemplary manner in FIG. 2, has a cable sheath 18 which encases all further cable components. A braided cable shield 19 of interlaced individual wires runs directly below the cable sheath 18. A cable film 20, which extends so as to be wound through the cable 2 along the cable central axis M for example, runs directly below the braided cable shield 19. The cable film 20 encases two inner conductors 21 which in turn run in each case in an insulation 22. The inner conductors 21 can be configured as individual wires or else preferably as a strand from a plurality of individual wires.

For producing the electrical cable 2, the device 1 can have, for example, a stripping module 3 (cf. FIG. 1) for relieving the braided cable shield 19 of the cable sheath 18 in the region of the front cable end. The severed piece of the cable sheath here can already be completely removed from the cable 2 (complete stripping), or else initially still partially remain on the cable 2 (partial stripping).

A mounting module 4 (cf. FIG. 1) can be disposed downstream of the stripping module 3 so as to mount one or a plurality of plug connector components, for example the illustrated support sleeve 23, on the cable 2. Optionally, the plug connector components can also already be fastened to the cable 2, for example press-fitted or crimped, respectively.

One or a plurality of cable shield processing modules 5, 6, 7 for cutting to length and/or folding back the braided cable shield 19 of the cable 2, which proceeding from the front cable end is exposed up to a stripping position $P_A$ (cf. FIG. 3), can be disposed downstream of the mounting module 4. Three cable shield processing modules 5, 6, 7 which can optionally also be combined so as to form a single cable shield processing module or be combined in a dedicated module group are illustrated in the exemplary embodiment of FIG. 1. The division into individual processing steps illustrated and described hereunder is to be understood to be merely exemplary.

A first cable shield processing module 5 can be configured for folding back the braided cable shield 19, proceeding from the front cable end in the direction toward the opposite cable end.

Figure 3:
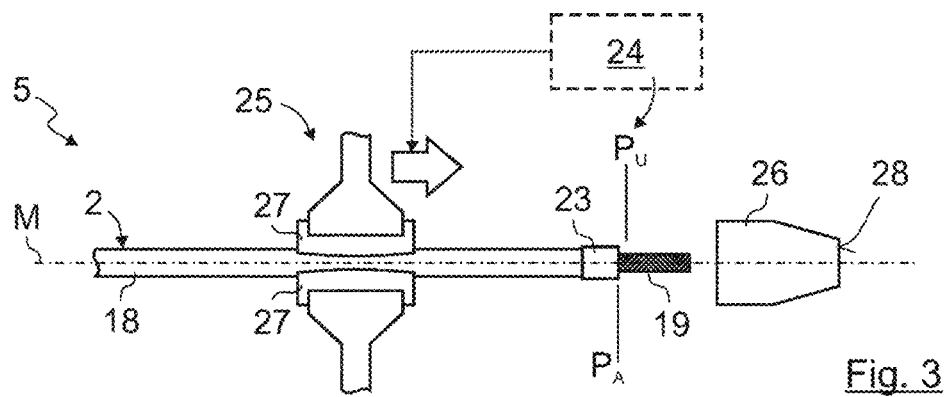
FIG. 3 shows a cable shield processing module for cutting to length and folding back a braided cable shield of the cable, having a mold shell and an actuating installation in a first processing step while introducing the cable into the mold shell.
Figure 4:
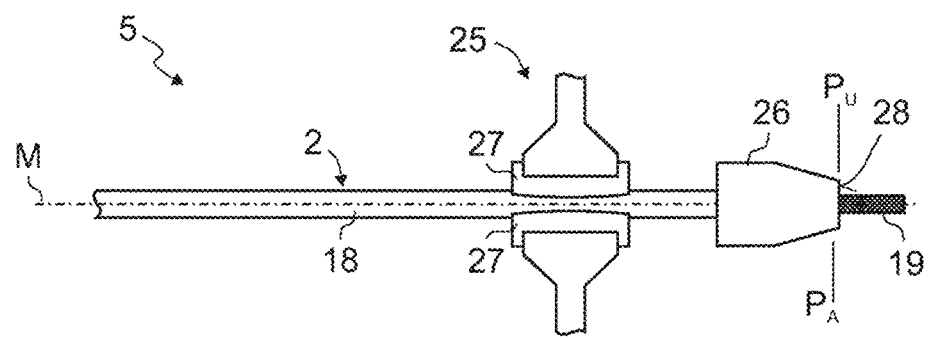
FIG. 4 shows the cable shield processing module of FIG. 3 in a second processing step once the mold shell has been positioned at the folding-back position.
Figure 5:
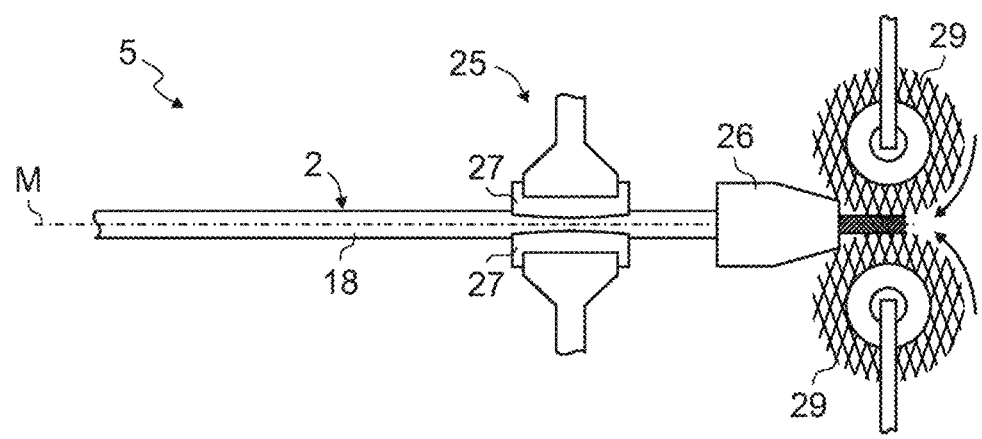
FIG. 5 shows the cable shield processing module of FIG. 3 in a third processing step while the braided cable shield, while using two brushes, is folded back over the mold shell.

The first cable shield processing module 5 here can be configured as illustrated in FIGS. 3 to 5, for example. The first cable shield processing module 5 can have, for example, a control installation 24 (indicated in FIG. 3) which is specified for determining a defined folding-back position $P_U$ along the cable central axis M for the braided cable shield 19. The folding-back position $P_U$ preferably deviates from the stripping position $P_A$.

The first cable shield processing module 5 can moreover have an actuating installation 25 which is specified for attaching a mold shell 26 to the cable 2 and, by way of a front end that faces the front cable end, positioning said mold shell 26 at the folding-back position $P_U$ (cf. FIGS. 3 and 4). The actuating installation 25 can be configured for actuating the cable 2 and/or the mold shell 26. The actuating installation 25 in the exemplary embodiment has two clamping jaws 27 which are displaceable, in the direction toward the cable central axis M, for fixing the cable 2 on the cable sheath 18 thereof and subsequently actuating said cable 2 in a linear manner into the immovable mold shell 26.

The mold shell 26 has an end-side detent face 28 for the braided cable shield 19. Moreover, the mold shell 26 tapers in the direction toward the front end thereof, or toward the detent face 28, respectively. It can however also be provided that the mold shell 26 does not taper toward the front end thereof; the braided cable shield 19 in this instance can be completely folded back.

The control installation 24, upon determining the defined folding-back position $P_U$, can be specified for transmitting corresponding control signals to the actuating installation 25 so as to correspondingly position the mold shell 26.

The folding-back position $P_U$ can in particular be determined in such a manner that the folding-back position $P_U$ along the cable central axis M of the cable 2 is disposed so as to be closer to the front cable end than the stripping position $P_A$. The folding-back position $P_U$ can in particular also be determined as a function of the assembly position of a pre-assembled plug connector component of the later plug connector, thus for example as a function of the assembly position of the support sleeve 23. The folding-back position $P_U$ can moreover be determined as a function of the stripping position $P_A$.

Once or while the mold shell 26 is attached to the cable 2, at least one drivable brush 29 (cf. FIG. 5) can be driven in the direction toward the rear cable end in such a manner that the braided cable shield 19 is brushed back across the support sleeve 23. Two brushes 29 are used in the exemplary embodiment. In principle however, an arbitrary number of brushes 29, optionally also only a single brush 29, can be provided. However, the use of exactly two brushes 29 has proven to be particularly advantageous in particular for the type of cable illustrated in FIG. 2.

Figure 6:
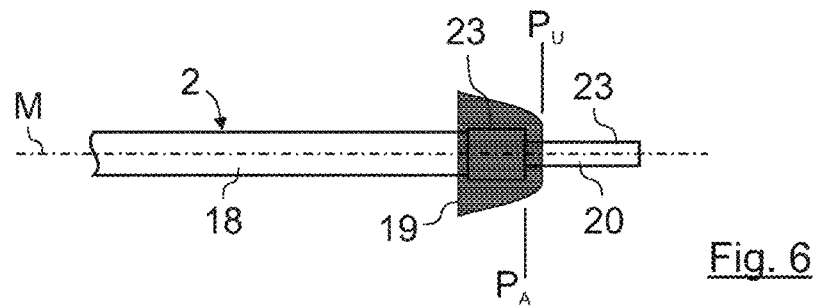
FIG. 6 shows the cable after the braided cable shield has been folded back.

FIG. 6 shows the state of the cable 2 after the braided cable shield 19 has been folded back onto the mold shell 26 and after the mold shell 26 has been removed. By virtue of the geometric shape of the mold shell 26, the braided cable shield 19 has not yet been completely folded back onto the support sleeve 23. This can be particularly advantageous with a view to the braided cable shield 19 being subsequently cut to length.

As has already been mentioned, the processing steps illustrated in FIGS. 3 to 6 in the context of the processing of the cable shield by the first cable shield processing module 5 are to be understood to be merely exemplary.

Figure 7:
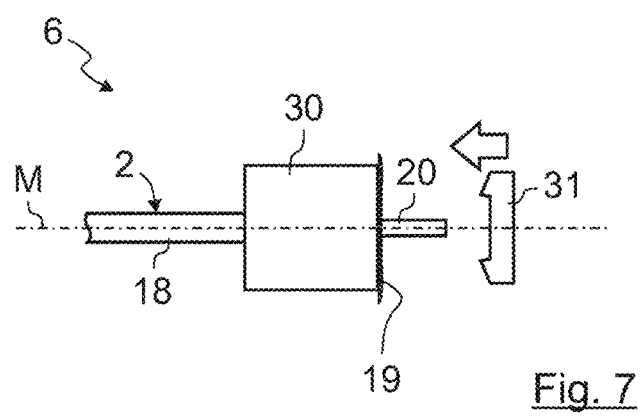
FIG. 7 shows a die and a stamping installation of a cable shield processing module for cutting to length the braided cable shield.

A second cable shield processing module 6, downstream of the first cable shield processing module 5 (cf. FIG. 1 and FIG. 7), can be configured for cutting to length the braided cable shield 19 in a defined manner. The cutting to length here can take place in different ways. For example, the braided cable shield 19 can be cut directly on the mold shell 26 illustrated in FIGS. 3 to 5. Alternatively, cutting to length, for example, can be provided by means of a die 30, illustrated in FIG. 7, having a contact area for the braided cable shield 19 and having a stamping installation 31, wherein the stamping installation 31 is capable of severing in a defined manner the braided cable shield 19 bearing on the contact area of the die 30.

It can however also be provided that the braided cable shield 19 after being folded back is no longer cut to length (this is actually even preferable because no film remnants, or no particles, respectively, are created in this instance). The length of the braided cable shield 19 in this instance preferably already corresponds to the nominal length desired during or after the folding back across the mold shell 26. The braided cable shield 19 in this instance can preferably already be completely folded back; the third cable shield processing module 7 described hereunder can in particular also be dispensed with in this instance.

Figure 8:
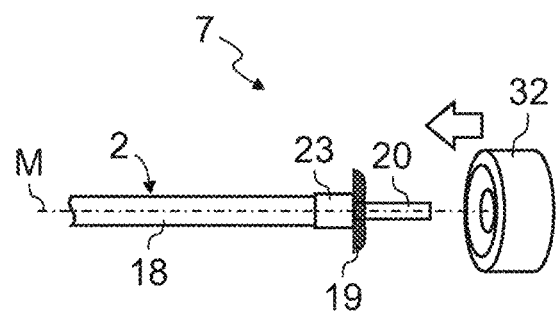
FIG. 8 shows a folding aid of a cable shield processing module for completely folding back the braided cable shield.

FIG. 8 in an exemplary manner shows a third cable shield processing module 7 which can be disposed downstream of the second cable shield processing module 6, as is indicated in FIG. 1. The third cable shield processing module 7 can be configured for folding back the braided cable shield 19 in the direction toward the rear cable end onto the support sleeve 23. A folding aid 32 can be used to this end, for example, as is illustrated in FIG. 8.

An orienting module 8 can be disposed downstream of the third cable shield processing module 7 (cf. FIG. 1). The orienting module 8 can be particularly suitable for producing electrical cables 2 which do not have a coaxial construction, such as the two-core cable 2 illustrated in FIG. 2, for example. The orientation of the cable, or the rotational alignment of the inner conductor 21 thereof, respectively, can be advantageous with a view to the downstream film processing. A potentially present lay, or twist, respectively, of the inner conductors 21 can also be taken into account when orienting the cable 2. The orienting module 8 can optionally be dispensed with in particular when a completely symmetrical cable 2, for example a coaxial cable, is to be produced.

According to the invention, a film processing module 9 for reducing the mechanical load-bearing capability of the cable film 20 can be provided at a tearing position $P_R$ (cf. FIG. 13) provided along the cable central axis M. The film processing module 9 can be disposed downstream of the orienting module 8, as is indicated in FIG. 1.

Figure 9:
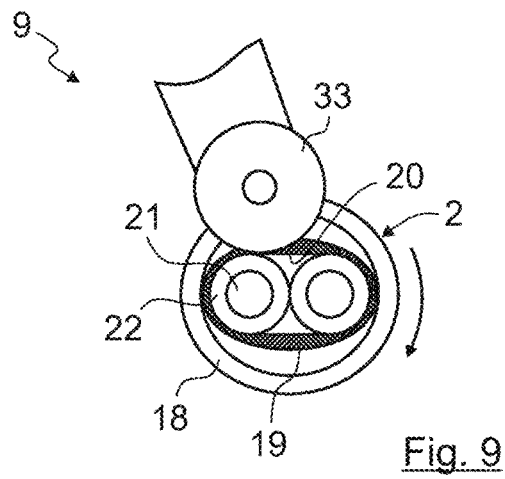
FIG. 9 shows a film processing module having a circular knife for scoring the cable film at a provided tearing position, in a simplified illustration.
Figure 10:
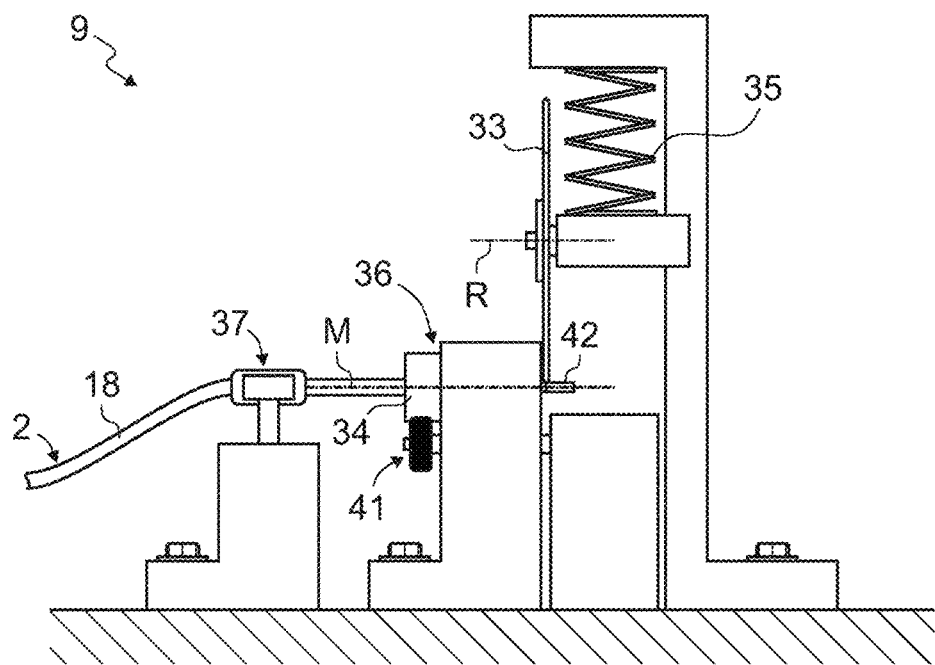
FIG. 10 shows a further film processing module having a circular knife for scoring the cable film at a provided tearing position, having a guide bush.
Figure 12:
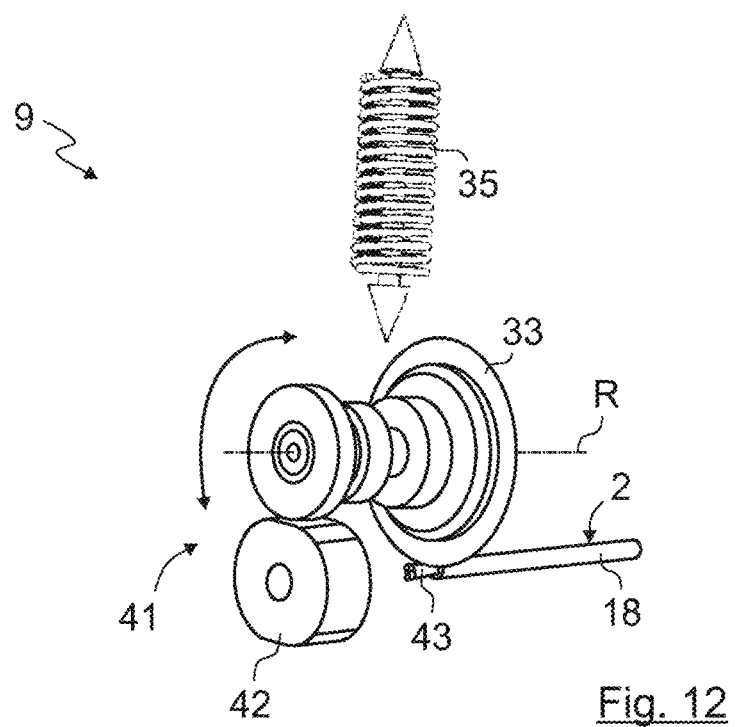
FIG. 12 shows a circular knife of a further film processing module, said circular knife for scoring the cable film at the tearing position being guided along a gate.

A film processing module 9 according to the invention is shown in a highly schematic and exemplary manner in FIG. 9. FIGS. 10 and 12 show further exemplary embodiments of a film processing module 9 according to the invention, having further details. The support sleeve 23 is omitted for reasons of simplification in FIG. 9 and FIG. 12.

The film processing module 9 has a circular knife 33 for scoring at the tearing position $P_R$ at least one external layer of the cable film 20 that faces away from the cable central axis M. The circular knife 33, in the absence of a drive, can be mounted so as to be rotatable about a rotation axis R (cf. FIG. 10) in such a manner that the circular knife 33 while cutting along the circumference of the cable 2 rolls on the cable film 20.

The film processing module 9 can optionally have a cutting depth control and/or a cutting depth limitation for the circular knife 33. A cutting depth limitation can be implemented, for example, by supporting the circular knife 33 on the cable sheath 18 or on the guide bush 34 which is still to be mentioned hereunder.

Optionally, the film processing module 9 can moreover have a cutting pressure control and/or a cutting pressure limitation for the cutting pressure applied to the cable film 20 by the circular knife 33. The cutting pressure can be applied, for example, by an elastic element, for example by the compression spring 35 indicated in FIGS. 10 and 12.

The cable film 20 can be scored in an at least partially ring-shaped manner, completely or in portions along the circumference of the cable 2. The cable film 20 at the tearing position $P_R$ can be scored in such a manner that a tear through the external layer and preferably at least partially also through an internal layer of the cable film 20 that is situated below the external layer is configured. The cable film 20 is preferably not completely cut through by the circular knife 33 so as not to score the cable components lying therebelow, presently the insulation 22 of the inner conductors 21, for example.

The film processing module 9 can have a fixing installation 36 which is specified for axially and/or radially fixing the cable 2.

The film processing module 9 can optionally have a guiding or supporting installation 37 (cf. FIG. 10) so as to advantageously guide the cable 2 during the processing.

Figure 11:
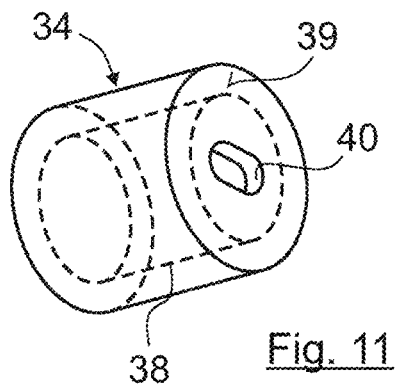
FIG. 11 shows the guide bush of FIG. 10 in a perspective illustration.

The film processing module 9 can have a guide bush 34 (cf. FIGS. 10 and 11) having a through bore 38 for guiding through the cable 2. The guide bush 34 on an end facing the circular knife 33 can have an end face 39 having a window 40 which for guiding through the front cable end is adapted to the external contour of the cable 2. As an alternative to the illustration in FIG. 11, the window 40 can also be configured so as to be completely round in order to avoid pressure being exerted on the cable 2, or in order to facilitate the introduction of the cable 2 into the guide bush 34, in particular in the case of the cable 2 of which the inner conductors 21 run in a twisted manner through the cable 2.

The circular knife 33, or of the blade of the circular knife 33, respectively, for scoring the cable film 20 can optionally be positioned at the end face 39 of the guide bush 34, or be guided by the guide bush 34, respectively, as is indicated in FIG. 10. The guide bush 34 can also be specified for radially and/or axially fixing the cable 2. The guide bush 34 can thus also be part of the fixing installation 36.

The film processing module 9 can moreover have a rotational installation 41 which is specified for rotating the cable 2 about the cable central axis M (cf. FIG. 10) and/or for rotating the circular knife 33 along the circumference of the cable 2 about the cable 2 (cf. FIG. 12). In the exemplary embodiment of FIG. 10 it is provided that the cable 2 is rotated about the cable central axis M.

It has been demonstrated that it can be easier to rotate the cable 2 instead of the circular knife 33, because the variable influence of gravity during the rotation of the circular knife 33 about the cable 2 in this instance cannot unpredictably influence the cutting depths. In the case of long cables 2, rotating the cable 2 can however not be particularly suitable, which is why it can in contrast also be advantageous for the circular knife 33 to be rotated about the cable 2.

The rotational installation 41 in the exemplary embodiment of FIG. 10 is specified for rotating the fixing installation 36, or the guide bush 34 conjointly with the cable 2, respectively, about the cable central axis M.

The rotational installation 41 in the exemplary embodiment of FIG. 12 is specified for rotating the circular knife 33 about the cable 2 along a gate 42. The distance of the gate 42, or the shape of the gate 42, respectively, can optionally be configured so as to follow the contour of the cable 2 in an optimal manner and/or for advantageously compensating the effect of gravity on the circular knife 33, or on the cutting pressure of the circular knife 33, respectively. The gate 42 can advantageously be able to be used for limiting the cutting depth. The gate 42 can be configured so as to be oval or at least approximately oval, for example as illustrated in FIG. 12. Instead of the circular knife 33 being rotated or guided, respectively, about the gate 42, the gate 42, conjointly with the circular knife 33, can optionally also be rotated about a gate rotation axis.

Figure 13:
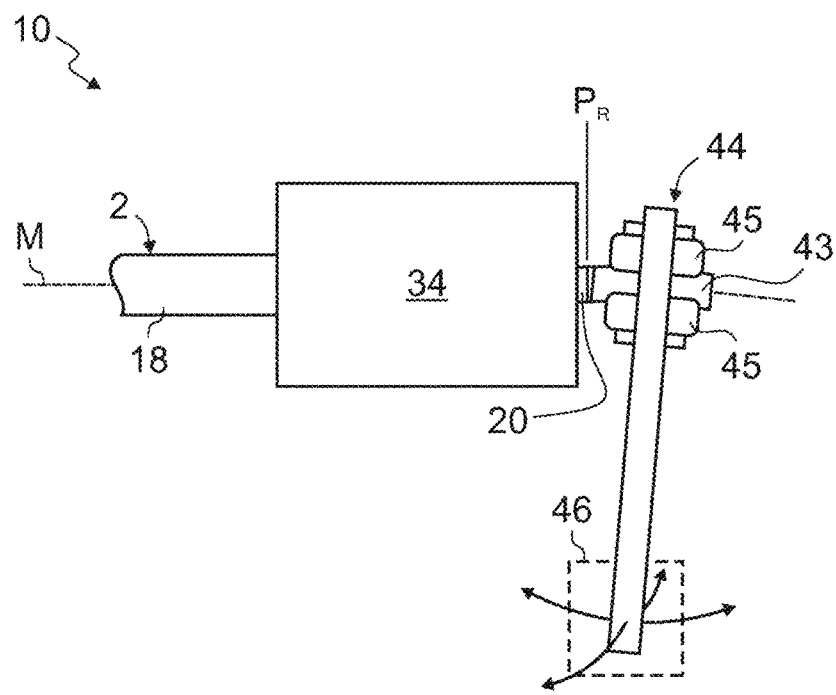
FIG. 13 shows a separating module having a gripping tool and an actuator installation for moving the gripping tool while the gripping tool fixes the end piece of the cable film.
Figure 14:
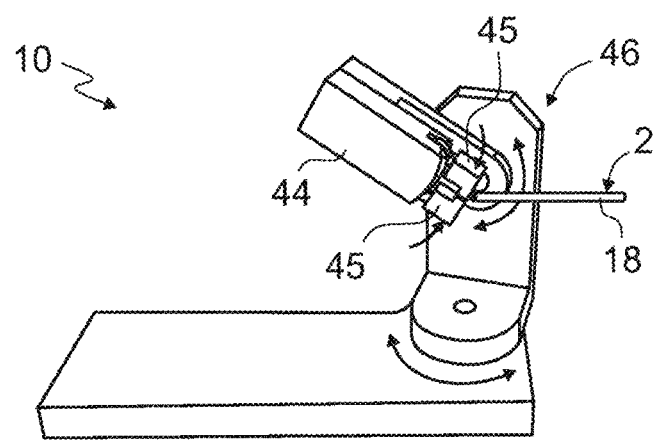
FIG. 14 shows a further separating module having a gripping tool and an actuator installation for moving the gripping tool while the gripping tool fixes the end piece of the cable film.

A separating module 10 for severing an end piece 43 of the cable film 20 at the tearing position $P_R$ can be disposed downstream of the film processing module 9 (cf. FIG. 1). An exemplary, schematic illustration of a separating module 10 is provided by FIG. 13. A further embodiment of a separating module 10 is illustrated in FIG. 14.

The separating module 10 can have a gripping tool 44 which is specified for gripping the end piece 43 of the cable film 20 to be severed adjacent to the tearing position $P_R$. The gripping tool 44 can in particular have two gripping jaws 45 which are actuatable in the direction toward the cable central axis M.

The separating module 10 can furthermore have an actuator installation 46 which is specified for twisting and/or bending the cable 2 and/or the cable film 20 and/or the end piece 43 of the cable film 20 conjointly in such a manner that the end piece 43 of the cable film 20 is severed at the tearing position $P_R$. The actuator installation 46 can in particular be specified for moving the gripping tool 44 along at least one degree of rotational freedom while the gripping tool 44 fixes the cable 2 or the cable film 20/the end piece 43 of the cable film 20. The gripping tool 44 is particularly preferably movable along at least two degrees of rotational freedom, as is illustrated in FIGS. 13 and 14.

A cleaning module 11 for removing particles or film remnants adhering to the cable 2 can optionally be disposed downstream of the separating module 10. A quality monitoring module 12 for checking the processing quality of the cable 2 can moreover be disposed downstream of the separating module 10. The cleaning module 11 and the quality monitoring module 12, as is derived from FIG. 1, are in an exemplary manner combined so as to form a module group 13.

The processing modules of a module group can be movable along a module transport direction (cf. arrow in FIG. 1). A rail guide 47 along which the processing modules (for example the cleaning module 11 and the quality monitoring module 12) are conjointly movable can be provided. The processing modules, or the cleaning module 11 and the quality monitoring module 12, respectively, can be fixedly assembled on one another, as a result of which a coupled movement is achieved. As a result thereof, the processing modules, or the cleaning module 11 is and the quality monitoring module 12, respectively, can be moved between storage locations L and a processing location B. Always exactly one of the processing modules, in the state illustrated in FIG. 1 the quality monitoring module 12, can thus in each case be situated at the processing location B for the processing of the cable 2. Upon processing of the cable 2 by one of the processing modules, the cable 2 can initially be moved out of the module group 13 again so far that a further processing module can be actuated toward the processing location B.

Figure 15:
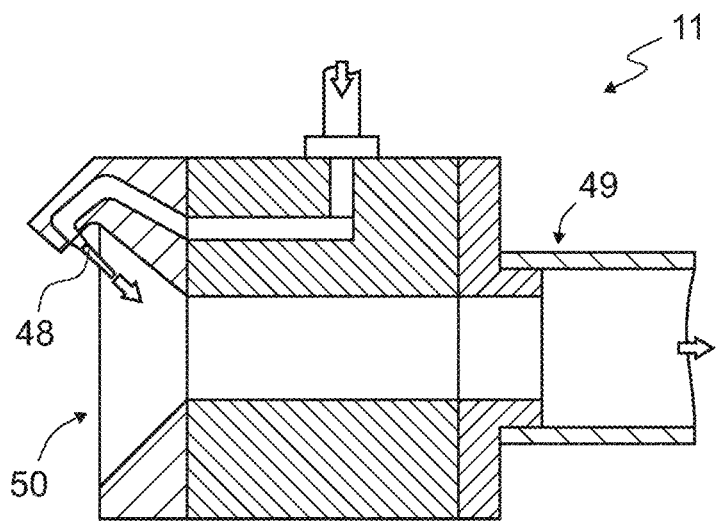
FIG. 15 shows a cleaning module for removing particles or film remnants adhering to the cable.

FIG. 15 in an exemplary manner shows a particularly advantageous design embodiment of a cleaning module 11. The cleaning module 11 has a nozzle 48 for blowing off the particles or film remnants, respectively, and a suctioning installation 49 for suctioning the particles or film remnants, respectively. The cable 2 can be introduced axially into a corresponding receptacle 50 of the cleaning module 11 (and/or the cleaning module 11 can be pushed over the cable 2). The particles or film remnants, respectively, can be blown off in the direction of the suctioning installation 49 by the nozzle 48. The electrical cable 2 can subsequently be guided out of the receptacle 50 again. The cable 2 and/or the cleaning module 11 can be rotated during the processing. The cleaning module 11 illustrated can of course be varied in an arbitrary manner and be combined or upgraded, respectively, with further means for facilitating the cleaning. For example, a vibrator or an ionizer can be provided. Brushes can optionally also be disposed upstream of the receptacle 50. Instead of the use of a single nozzle 48, an annular nozzle and/or a plurality of individual nozzles can also be provided.

Figure 16:
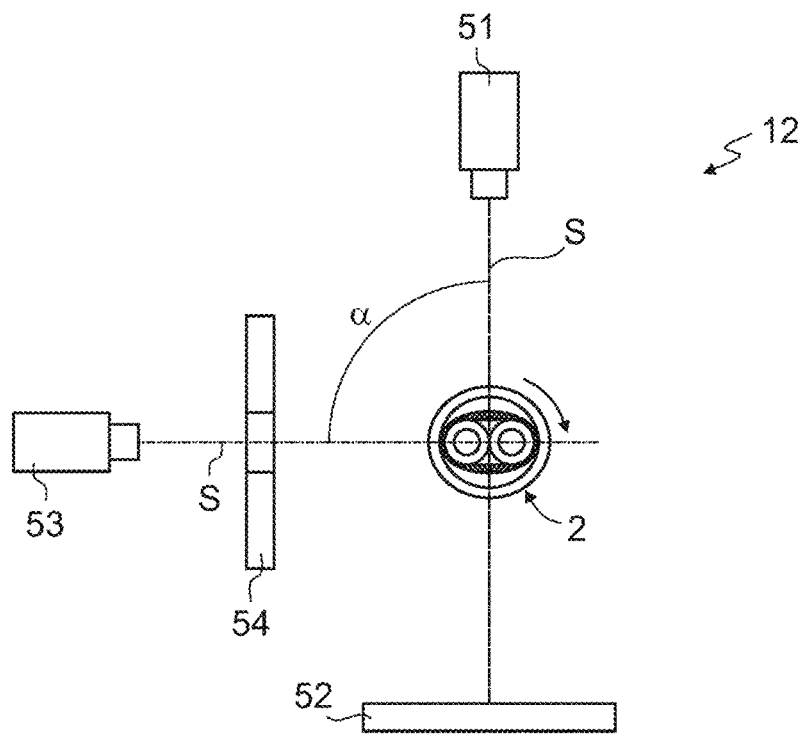
FIG. 16 shows a quality monitoring module for checking the processing quality of the cable.

A quality monitoring module 12 for monitoring the quality of the production according to the invention is illustrated in an exemplary manner in FIG. 16. The state of at least one of the two cable ends of the cable 2 before and/or after at least one processing procedure can be detected while using a quality monitoring module 12, in particular the quality monitoring module 12 illustrated.

It can be provided that the line of vision S of a first optical sensor 51 is directed toward the cable end, wherein a first illumination unit 52 along the line of vision S of the first sensor 51 is disposed behind the cable end so as to generate transmitted light, or back light, respectively, for the optical detection of the cable end.

Furthermore, the line of vision S of a second optical sensor 53 is likewise directed toward the cable end, wherein a second illumination unit 54 along the line of vision S of the second sensor 53 is disposed in front of the cable end so as to generate incident light for the optical detection of the cable end. In order for the vision of the second sensors 53 onto the cable end not to be blocked, the second illumination unit 54 has a central recess.

The first sensor 51 and the second sensor 53 are in each case configured as a camera having a respective lens.

The first illumination unit 52 and the second illumination unit 54 are in each case disposed so as to be coaxial with the lines of vision S of the optical sensors 51, 53. In principle however, an offset disposal can also be provided. The second sensor 53 is disposed so as to be offset by a defined angle α in relation to the first sensor 51, said angle α in principle potentially being arbitrary. An angle α of 90° is provided in the exemplary embodiment.

The lines of vision S of the sensors 51, 53 are preferably aligned so as to be orthogonal to the cable central axis M. A tilted alignment can however also be provided.

In order to avoid that the measurements of the sensors 51, 53 influence one another, it can be provided that the measurements are carried out in a temporally offset manner, and/or that the illumination units 52, 54 emit light of different light colors and/or light polarizations.

It can furthermore be provided for the sensors 51, 53 to be rotated radially about the cable central axis M and/or for the cable 2 to be rotated about the cable central axis M thereof, while the sensors 51, 53 record single images and/or video information.

The invention claimed is:

1. A device for producing an electrical cable which has a cable film, said device comprising a film processing module for reducing a mechanical load-bearing capability of the cable film at a tearing position (Pr) provided along a cable central axis (M),
    wherein the film processing module has a circular knife for scoring at the tearing position (Pr) an at least one external layer of the cable film that faces away from the cable central axis (M); and
    wherein the film processing module comprises a gate positioned along the cable central axis (M) to limit a cutting depth of the circular knife by guiding the circular knife about the cable along the gate.

2. The device as claimed in claim 1, wherein the film processing module has a cutting depth control.

3. The device as claimed in claim 1,
    wherein the film processing module has an at least one of a cutting pressure control and a cutting pressure limitation for the cutting pressure applied to the cable film by the circular knife.

4. The device as claimed in claim 1,
    wherein the film processing module has a fixing installation which is configured to fix the cable at least one of axially and radially.

5. The device as claimed in claim 1,
    wherein the film processing module comprises a guide bush having a through bore for guiding through the cable.

6. The device as claimed in claim 1,
    wherein the film processing module has a rotational installation which is configured to at least one of rotate the cable about the cable central axis (M) and rotate the circular knife along a circumference of the cable about the cable.

7. The device as claimed in claim 6,
    wherein the rotational installation is configured to at least one of rotate a fixing installation and a guide bush conjointly with the cable about the cable central axis (M).

8. The device as claimed in claim 1,
    wherein a separating module for severing an end piece of the cable film at the tearing position ($P_R$) is provided downstream of the film processing module.

9. The device as claimed in claim 8,
    wherein the separating module has a gripping tool which is configured to grip the end piece of the cable film to be severed adjacent to the tearing position ($P_R$).

10. The device as claimed in claim 9,
    wherein the gripping tool has two gripping jaws which are actuatable in a direction toward the cable central axis (M).

11. The device as claimed in claim 8,
wherein the separating module has an actuator installation which is configured to bend the cable conjointly with the cable film in such a manner that the end piece of the cable film is severed at the tearing position ($P_R$).

12. The device as claimed in claim 11,
wherein the actuator installation is configured to move a gripping tool along an at least one degree of rotational freedom while the gripping tool fixes the cable.

13. The device as claimed in claim 8,
wherein a cleaning module, configured to remove an at least one of a particle and a film remnant adhering to the cable, is provided downstream of the separating module.

14. The device as claimed in claim 1,
wherein a cable shield processing module configured to at least one of cut to length and to fold back a braided cable shield of the cable which, proceeding from a front cable end, is exposed up to a stripping position ($P_A$), is provided upstream of the film processing module.

15. A method for producing an electrical cable having a cable film, the method comprising a step of using a circular knife to score, at a tearing position (Pr) provided along a cable central axis (M), an at least one external layer of the cable film that faces away from the cable central axis (M), wherein a cutting depth of the circular knife is limited by a gate positioned along the cable central axis (M), the circular knife being guided about the cable along the gate, and
wherein a mechanical load-bearing capacity of the cable film is reduced at the tearing position (Pr).

16. The method as claimed in claim 15,
wherein the cable film is scored at least in one of a partially ring-shaped manner, completely, and in portions along a circumference of the cable.

17. The method as claimed in claim 15,
wherein the cable film at the tearing position ($P_R$) is scored in such a manner that a tear through the external layer of the cable film is formed.

18. The method as claimed in claim 15,
wherein an at least one of a cutting depth and a cutting pressure of the circular knife while scoring along a circumference of the cable is limited.

19. The method as claimed in claim 15,
wherein the cable is at least one of twisted and bent in such a manner that an end piece of the cable film is severed in an at least a partially ring-shaped encircling manner along the tearing position ($P_R$).

20. A device for producing an electrical cable which has a cable film, said device comprising a film processing module for reducing a mechanical load-bearing capability of the cable film at a tearing position ($P_R$) provided along a cable central axis (M),
wherein the film processing module has a circular knife for scoring at the tearing position ($P_R$) an at least one external layer of the cable film that faces away from the cable central axis (M); and
wherein the film processing module is configured to guide the circular knife along a gate positioned along the cable central axis (M), thereby forming a cutting depth limitation.

21. The device as claimed in claim 20,
wherein the circular knife is mounted so as to be rotatable about a rotation axis (R) in such a manner that the circular knife, while moving along a circumference of the cable, rolls on the cable film.

22. The device as claimed in claim 20,
wherein the film processing module has a cutting depth control for the circular knife.

23. The device as claimed in claim 20,
wherein the film processing module has an at least one of a cutting pressure control and a cutting pressure limitation for the cutting pressure applied to the cable film by the circular knife.

24. The device as claimed in claim 20,
wherein the film processing module comprises a guide bush having a through bore for guiding through the cable.

25. The device as claimed in claim 20,
wherein the film processing module has a rotational installation which is configured to at least one of rotate the cable about the cable central axis (M) and rotate the circular knife along a circumference of the cable about the cable.

26. The device as claimed in claim 25,
wherein the rotational installation is configured to at least one of rotate a fixing installation and a guide bush conjointly with the cable about the cable central axis (M).

27. The device as claimed in claim 20,
wherein a separating module for severing an end piece of the cable film at the tearing position (PR) is provided downstream of the film processing module.

28. The device as claimed in claim 27,
wherein the separating module has a gripping tool which is configured to grip the end piece of the cable film to be severed adjacent to the tearing position (PR).

29. The device as claimed in claim 28,
wherein the gripping tool has two gripping jaws which are actuatable in a direction toward the cable central axis (M).

30. The device as claimed in claim 27,
wherein the separating module has an actuator installation which is configured to bend the cable conjointly with the cable film in such a manner that the end piece of the cable film is severed at the tearing position (PR).

* * * * *